Patented Oct. 21, 1941

2,259,466

UNITED STATES PATENT OFFICE 2,259,466

EMULSION

Benjamin R. Harris and Frank J. Cahn, Chicago, Ill., assignors to The Emulsol Corporation, Chicago, Ill., a corporation of Illinois No Drawing. Application January 24, 1940, Serial No. 315,334

18 Claims. (Cl. 167—91)

This invention relates to the preparation of materials which are readily dispersible or emulsifiable in or with aqueous media, as well as to the preparation of stable dispersions or emulsions, especially of the type comprising aqueous media and oleaginous, resinous, or other water-repelling materials.

Emulsions or dispersions of the character referred to have been prepared heretofore in which emulsifying or dispersing agents of numerous types have been utilized. While the stability of these emulsions or dispersions is enhanced by the addition of said emulsifying or dispersing agents, still, in many instances, the improvements have not been sufficiently marked so as to provide a completely satisfactory solution to the problems confronting those versed in the art.

Among the numerous emulsifying or dispersing agents whose use has been suggested for enhancing the stability of oleaginous-aqueous emulsions are the higher molecular weight aliphatic alcohol sulphates and sulphonates, the sulphonated oils such as Turkey-red oil, the sulphates and phosphates of higher fatty acid monoglycerides, monoglycerides and diglycerides of higher molecular weight aliphatic, particularly, fatty acids, and the like. None of these agents has been found to be fully satisfactory since, among other things, the emulsions, for example, tend to separate on more or less prolonged standing.

In accordance with the present invention, emulsions and dispersions of excellent character and stability are produced by utilizing certain emulsifying agents, hereinafter defined and described in detail. These emulsifying agents, which are incorporated in the emulsions or dispersions in varying amounts, are reaction products or condensation products in the form of derivatives of hydroxy-alkyl amines. In general, such agents or reaction products comprise amides of hydroxy amines with aliphatic carboxylic acids containing not more than five carbon atoms, said compounds also including a higher molecular weight lipophile group, particularly in aliphatic or fatty acid acyl group. More particularly, most of the agents comprise or may be characterized as amides of hydroxy-alkyl amines, especially secondary hydroxy-alkyl amines, with aliphatic acids containing not more than five carbon atoms, the hydrogen of one hydroxyl group of an hydroxy-alkyl group being replaced by a lipophile radical containing at least eight carbon atoms.

Many of the agents which may be utilized for the purposes of the present invention fall within the scope of the general formula:

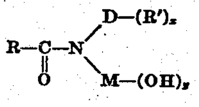

wherein

is an aliphatic acyl radical containing not more than five carbon atoms, D and M are the same or dissimilar organic radicals containing at least two carbon atoms, R′ is an organic lipophile radical, and $x$ and $y$ are small whole numbers, for example, one or two.

A more limited aspect of the agents which are employed in accordance with the present invention may be represented by the general formula

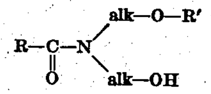

wherein

is an aliphatic acyl radical containing not more than five carbon atoms, alk is a member selected from the group consisting of alkylene, (alkylene-O-alkylene)$_t$ and (alkylene-S-alkylene)$_w$ where $t$ and $w$ are whole numbers, and R′ is a lipophilic organic radical containing at least eight carbon atoms.

A further and still more limited representation of agents used for the purpose of the present invention, covering especially preferred embodiments, may be represented by the general formula:

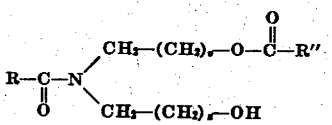

wherein

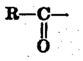

is a fatty acid acyl radical containing not more than five carbon atoms and preferably only two carbon atoms,

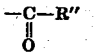

is a fatty acid acyl radical containing at least eight carbon atoms, and $v$ and $z$ are whole numbers.

The radical R' in the above formulae may be of aliphatic, cyclo-aliphatic, aromatic or aromatic-aliphatic character and may include substituent groups such as amino, hydroxy, halogen, sulphate, sulphonate, phosphate, carboxyl, nitrile, and the like, as will be pointed out hereinafter but it is particularly preferred that it be unsubstituted aliphatic or fatty and contain at least eight and preferably from twelve to eighteen carbon atoms. D, M, and alk, likewise, may contain substituent groups such as amino, hydroxy, halogen, sulphate, sulphonate, phosphate, carboxyl, nitrile, and the like, and the sequence of carbon atoms therein may be interrupted by O, S, C═O, NH, NR where R is alkyl, and the like. It is especially preferred, however, that each of D, M and alk comprise unsubstituted alkylene radicals containing from two to four carbon atoms.

In order that the nature of the agents which are used for the purposes of the invention may become more apparent, there are listed hereinbelow representative agents which fall within the scope of the present invention.

(1) 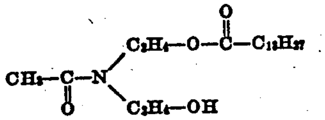

(2) 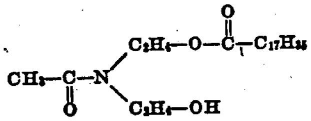

(3) 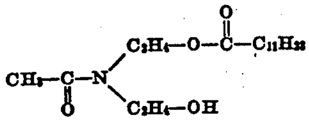

(4) 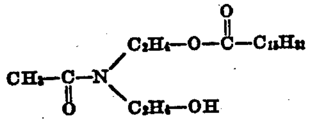

(5) 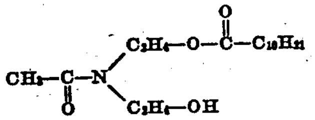

(6) 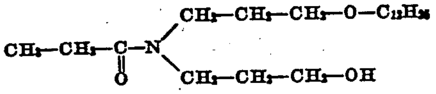

(7) 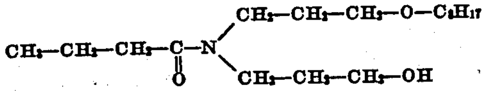

(8) 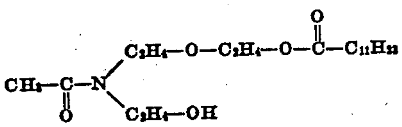

(9) 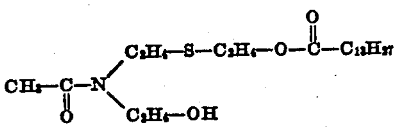

(10) 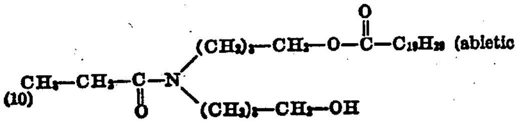 (abietic acid)

(11) 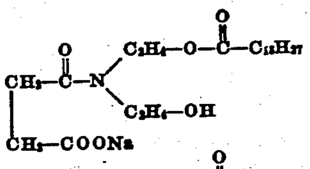

(12) 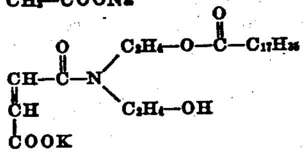

(13) 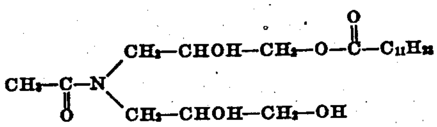

(14) 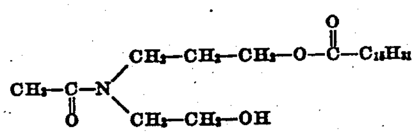

(15) 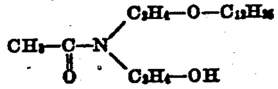

(16) 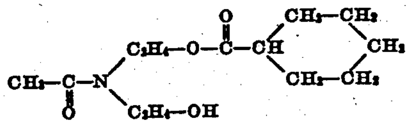

(17) 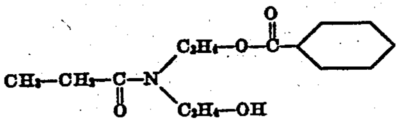

(18) 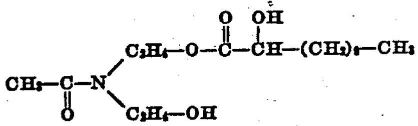

(19) 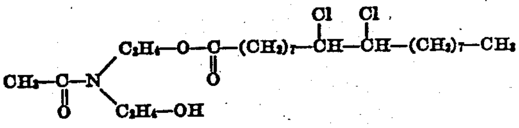

(20) 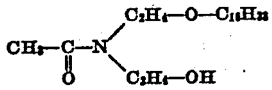

(21) 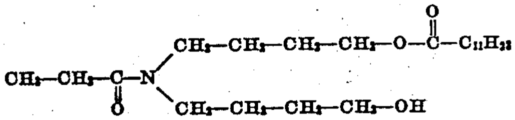

(22) 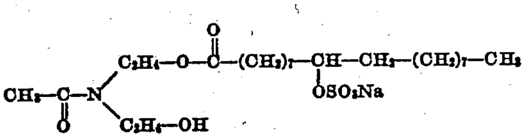

(23) 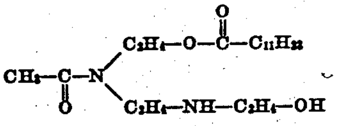

(24) 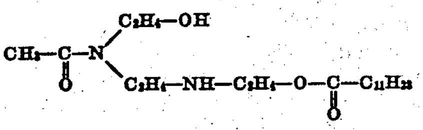

(25) 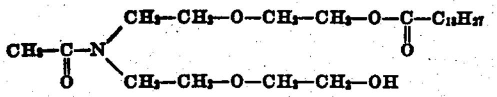
(26) 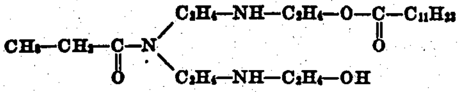
(27) 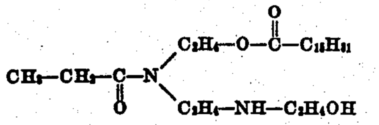
(28) 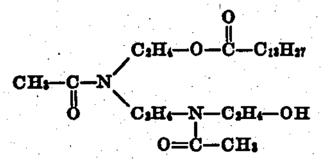
(29) 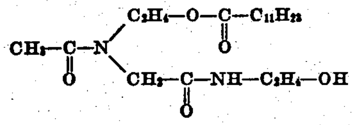
(30) 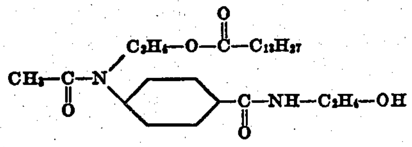
(31) 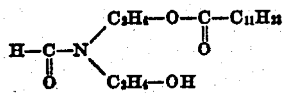
(32) 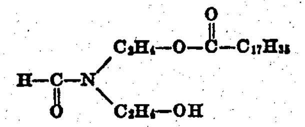
(33) 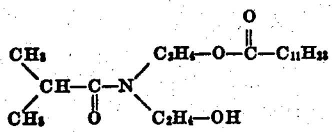
(34) 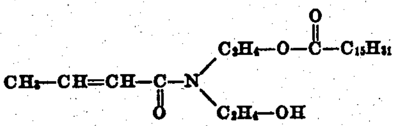
35) 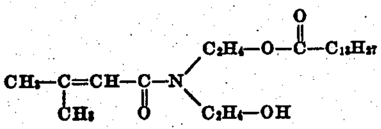
(36) 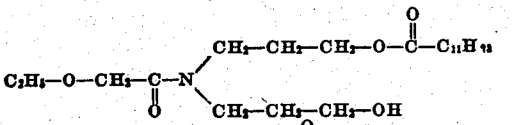
(37) 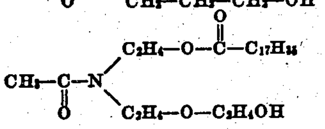
(38) 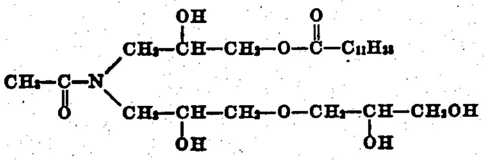
(39) 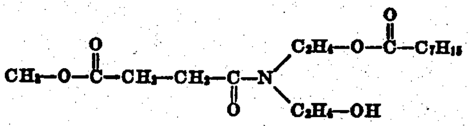
(40) 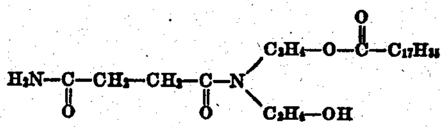
(41) 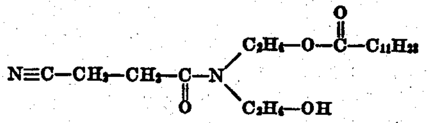
(42) 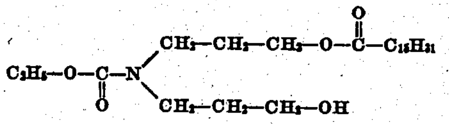
(43) 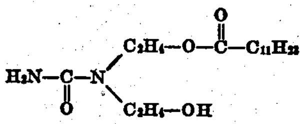
(44) 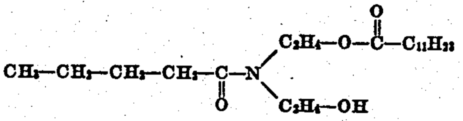
(45) 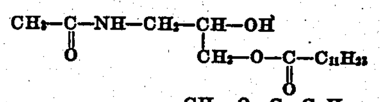
(46) 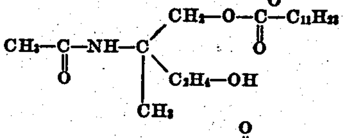
(47) 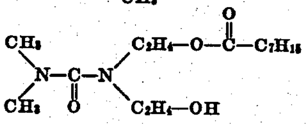
(48) 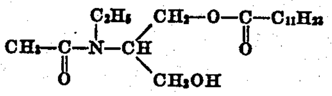
(49) 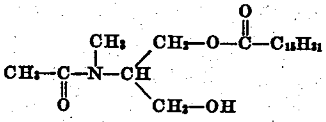
(50) 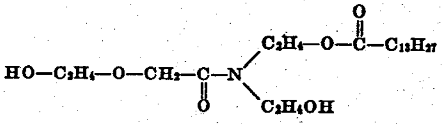
(51) 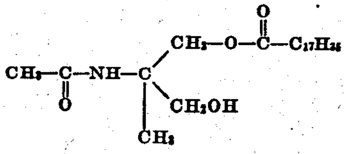
(52) 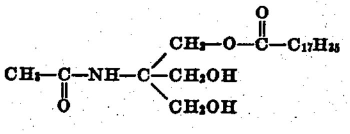

(53) 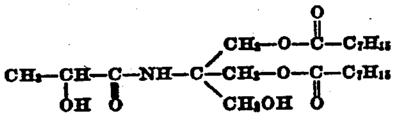

(54) 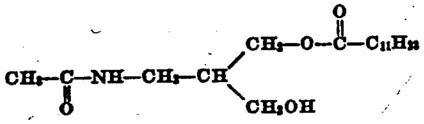

(55) 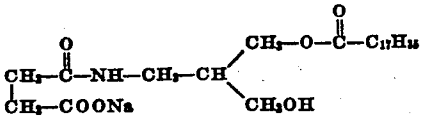

(56) 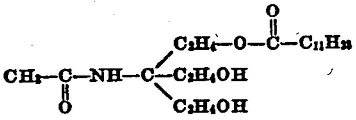

(57) 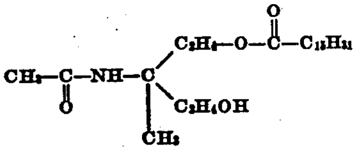

(58) 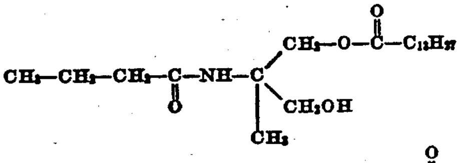

(59) 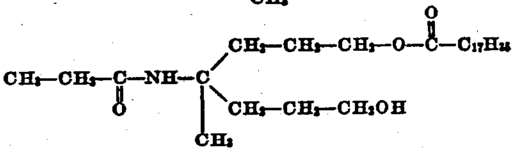

(60) 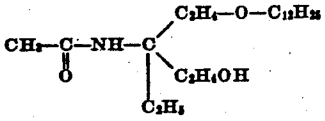

(61) 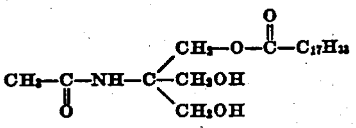

(62) 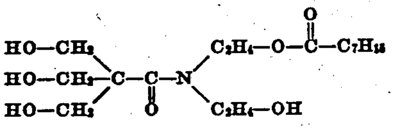

(63) 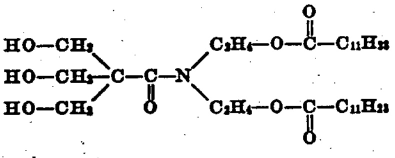

(64) 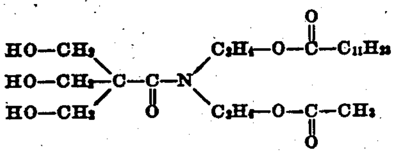

(65) 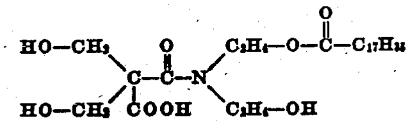

(66) 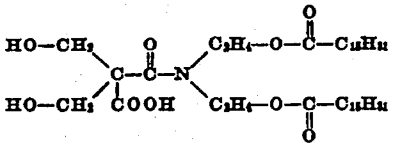

(67) 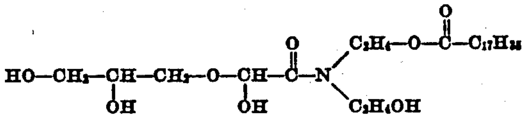

(68) 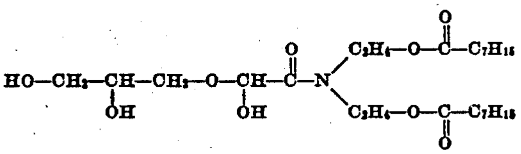

(69) 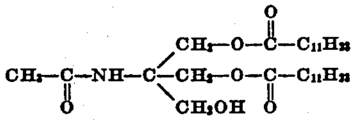

(70) 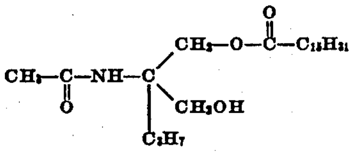

(71) 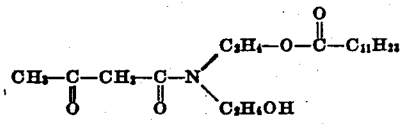

While the above examples represent single substances, it will be understood that, in practice, it is, in general, advantageous to employ the agents in the form of reaction or condensation products or mixtures, which reaction mixtures contain preferably substantial proportions of said agents. It will also be understood that mixtures of any two or more of the agents may be utilized with or without diluents. It will furthermore be appreciated that, in the preparation of the agents which are utilized for the purposes of the present invention, the various higher fatty acids or the like, hydroxyl-alkyl amines and carboxylic acids containing not more than five carbon atoms may be utilized in numerous combinations and permutations to make large numbers of agents not specifically mentioned but the use of which is, nevertheless, within the scope of the invention as pointed out more particularly in the claims.

In general, most of the agents are prepared by initially reacting a hydroxy-alkyl amine containing hydrogen attached to nitrogen, and especially a secondary hydroxy-alkyl amine, for example, diethanolamine, with an aliphatic carboxylic acid containing not more than five carbon atoms, or a derivative of such acid such as the halide or ester thereof, for example, acetic acid, acetic anhydride, acetyl chloride, ethyl acetate or methyl acetate, under conditions such as assure a substantial yield of amide. The resulting amide is then reacted with a higher molecular weight organic acid or halide thereof or other lipophile compound in order to introduce a lipophile radical into the molecule, as hereinafter more clearly set forth. The following examples are illustrative of methods which have been found suitable for preparing various of the dispersing agents which are disclosed herein.

It will be appreciated that other methods may be utilized and that the proportions of reacting ingredients, times of reaction, order of steps, and temperatures may be varied and that supplementary processes of purification and the like may be resorted to wherever found desirable or convenient. These and other variations and modifications will become evident to those skilled in the art in the light of the guiding principles which are disclosed herein.

EXAMPLE A (1) 224 grams of methyl acetate (3 mols) and 210 grams of diethanolamine (2 mols) were mixed together, two layers forming at first, the mixture becoming a homogeneous mass after a short time. The mixture was refluxed for 19 hours at which time 90% of the diethanolamine had reacted. A portion of the reaction mixture was subjected to a vacuum of 6 millimeters at 60 degrees C. in order to drive off the volatile material, namely the unreacted methyl acetate and the methyl alcohol which was formed during the reaction. The residue, upon titration, showed a content of 4.64% of free diethanolamine. To 192.5 grams of this residue, 34.7 grams of methyl acetate were added and the mixture was refluxed for 3½ hours. The resulting reaction product was then freed from its low boiling constituents, namely, the methyl alcohol and unreacted methyl acetate, by maintaining the mass at 70 degrees C. under a pressure of 6 millimeters. The residue contained approximately 0.8% of unreacted diethanolamine, based upon a determination of the alkalinity of said residue by titration. The product was a light yellow colored syrup, soluble in water, and contained a compound which was essentially the acetic acid amide of diethanolamine, having the following formula:

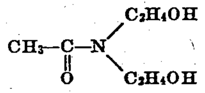

(2) 51.0 grams (2 mols) of the acetic acid amide of diethanolamine, produced as described in part 1 hereof, and 38.0 grams (1 mol) of lauric acid were heated together for 15 minutes at approximately 200 degrees C., while passing carbon dioxide gas through the reaction mixture. At the end of the 15 minutes, the free lauric acid had decreased to 1.3%. The product was a yellow colored syrup, dispersible in water and having good emulsifying and dispersing properties. It could be salted out of its solution by the addition thereto of sodium chloride. The product consisted essentially of a compound having the following formula:

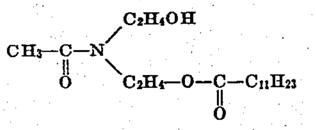

EXAMPLE B 21.1 grams of the acetic acid amide of diethanolamine, produced as described in part 1 of Example A hereinabove, and 20 grams of lauric acid were heated at 200 degrees C. for 10 minutes, carbon dioxide gas being passed through the reaction mixture during the reaction in order to remove the water formed as a result of the esterification. The product was a yellow oil, essentially devoid of free fatty acid and freely dispersible in water. It had good emulsifying and dispersing properties. By the addition of sodium chloride to the solution it could be salted out. The reaction product contained essentially the monolauric acid ester of the acetic acid amide of diethanolamine.

EXAMPLE C (1) 156 grams of methyl lactate and 157.5 grams of diethanolamine were refluxed for 3 hours at 94 degrees C., the alkalinity calculated as diethanolamine dropping from 50.5% to 5.4%. To the reaction mass 78 grams of methyl lactate were added and refluxing was continued for 3 and ½ hours at 95 degrees C. The alkalinity dropped to 0.9% expressed as diethanolamine. The excess methyl lactate and the methyl alcohol which formed during the reaction were removed by distillation at a pressure of 10 mm. and at a temperature up to about 120 degrees C. The reaction product was a reddish brown, water-soluble, somewhat viscous material and comprised largely or essentially the lactic acid amide of diethanolamine.

(2) 37.3 grams of the lactic acid amide of diethanolamine, produced in part 1 hereof, and 9.8 grams of lauric acid were heated together to 60 degrees C. whereupon a homogeneous solution resulted, and the heating was then continued for 20 minutes at 140 degrees C., for 20 minutes at 150 degrees C., for 20 minutes at 170 degrees C. and for 15 minutes at 180 degrees C. The reaction product was a reddish brown oil which possessed good emulsifying properties and which also foamed well even in acidified aqueous media. The product contained a substantial proportion of the lauric acid mono-ester of the lactic acid amide of diethanolamine.

As Examples 6, 7, 15 and 20 show, the agents may also comprise higher molecular weight ether derivatives. The higher molecular weight ethers may be prepared, for example, by reacting a compound containing a reactive halogen—

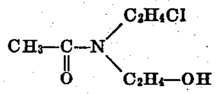

with an alkali metal alcoholate such as sodium laurylate or sodium octylate in accordance with general methods known in the art. In general, the higher fatty acid esters are more particularly satisfactory for most purposes and are, therefore, especially preferred.

The organic radical represented by R in the formulae may be derived from various sources. Among the sources may be mentioned acetic acid, acetoacetic acid, ethyl acetate, methyl acetate, acetic anhydride, acetyl chloride, formic acid, lactic acid, propionic acid, butyric acid, hydroxy-butyric acid, furoic acid, ketene, tartaric acid, succinic acid, maleic acid, fumaric acid, crotonic acid; trimethylol acetic acid, dimethylol malonic acid, and homologues thereof; and, in general, aliphatic carboxylic acids, their esters, anhydrides and acyl halides, and substitution derivatives of said acids such as hydroxy, hydroxyalkyl, and carboxylic derivatives, which contain not more than five carbon atoms. Of special utility in most cases, for the purposes of the present invention, are acetic acid, its esters and halides.

The organic radical represented by R', in other words the lipophile group, in the various general formulae hereinabove may also be derived from a plurality of sources among which may be mentioned, for example, straight chain and branched chain, saturated and unsaturated, carboxylic, aliphatic (including cycloaliphatic), fatty, aromatic, hydroaromatic, and araliphatic acids including caprylic acid, capric acid, pimelic acid, sebacic acid, behenic acid, arachidic acid, cerotic acid, erucic acid, melissic acid, stearic acid, oleic acid, ricinoleic acid, ricinelaidic acid, ricinostearolic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil and other fish oils, partially or completely hydrogenated animal and vegetable oils such as those mentioned; oxidized and/or polymerized higher fatty acids or higher fatty acids derived from oxidized and/or polymerized triglyceride oils; acyloxy carboxylic acids such as

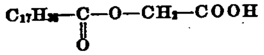

hydroxy and alpha-hydroxy higher carboxylic, aliphatic and fatty acids such as 1-hydroxy stearic acid, dihydroxypalmitic acid, dihydroxystearic acid, dihydroxybehenic acid, alpha-hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermaceti, montan wax, coccerin, and carnauba wax and higher molecular weight carboxylic acids derived, by oxidation and other methods, from paraffin wax, petroleum and similar hydrocarbons; resinic and hydro-aromatic acids such as abietic acid; araliphatic and aromatic acids such as phthalic acid, Twitchell fatty acids, naphthoic acid; naphthenic acids; hydroxy aromatic acids such as hydroxy naphthoic acids, and the like and substitution and addition derivatives of the aforementioned acids, in particular, halogen addition and substitution derivatives. It will be understood that mixtures of any two or more of said acids may be employed if desired and it will also be appreciated that said acids may contain substituent groups such as sulphate, sulphonic, nitrile, thiocyanogen, carbonyl, amide, amine or substituted amine, halogen, ketone and other groups. The acids may be employed as such or in the form of derivatives thereof such as carboxylic acid acyl halides, esters and the like. Of particular utility are the fatty acids or their acyl halides containing at least twelve and preferably from sixteen to eighteen carbon atoms.

In those cases where higher molecular weight ethers of the amides of the hydroxy-alkyl amines are prepared, the higher molecular weight ether radical may be derived from alcoholates prepared from alcohols corresponding to the higher molecular weight acids referred to hereinabove.

The hydroxy amines which are reacted with the acetic acid or the like to produce the intermediate amide include, among others, by way of example, diethanolamine, dipropanolamine, dibutanolamine, dipentanolamine, dihexanolamine, 2-methylamino-propan-diol-1,3; 1-phenylamino-propan-diol-2,3; 1-hydroxy-ethylamino-2, methoxy-propan-ol-3; 2-N-methylamino-propan-diol-1,3; monoethanol monopropanolamine, monoethanol monobutanolamine, glycerol mono-amines, namely, 1-amino-2,3-propanediol and 2-amino-1,3-propanediol; diglycerol-amine; hydroxylamine ($H_2N—OH$) and derivatives thereof such as result from replacement of one amine hydrogen by an alkyl such as methyl, ethyl, propyl, butyl and the higher homologues; hydroxy amines, particularly secondary hydroxy amines, derived from polyhydric alcohols, including sugars and sugar alcohols such as dextrose, sucrose, sorbitol, mannitol and dulcitol,

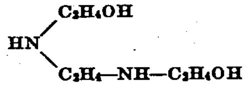

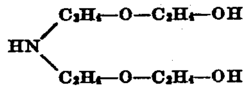

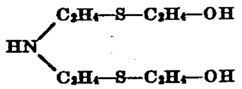

and the like; 2-amino-2-methyl-1,3-propanediol; trimethylol amino methane; 2-amino-2-n-propyl-1,3-propanediol; 2-amino-2-isopropyl-1,3-propanediol; 2-amino-2-methyl-1,4-butanediol; 2-amino-2-methyl-1,5-pentanediol; 2-amino-2-ethyl-1,3-propanediol; 2-amino-2-ethylol-1,3-propanediol; 2-amino-2-methyl-1,6-hexanediol; 1-amino-1,1-dimethyl ethanol; trimethylol amino-methyl methane; trimethylol amino-methylol methane. The glycerol mono-amines and the related hydroxy amines such as various of those disclosed hereinabove may be prepared by various procedures and in different ways. Many of them are conveniently produced by nitrating paraffin hydrocarbons, substituting methylol groups for hydrogen on the carbons to which the nitro groups are attached, and then reducing the nitro groups to amine groups. These amine groups may be further alkylated or otherwise substituted if desired. Polymerized non-tertiary hydroxy amines or polymerized hydroxy amines containing hydrogen directly attached to nitrogen and prepared, for example, by polymerizing monoethanolamine or diethanolamine or mixtures thereof, or other hydroxy amines such as those mentioned hereinabove, particularly in the presence of a catalyst such as sodium hydroxide or the like, may also be employed. The preparation of polymerized hydroxy amines is disclosed, for example, in United States Patent No. 2,178,173; and homologues and substitution derivatives of the above-mentioned hydroxy amines. Because of commercial and other considerations, diethanolamine is especially desirable. It will be understood that the hydroxy amines may be utilized in pure, impure or commercial form.

The especial utility of the agents described hereinabove for the purposes of the present invention appears to result from a particular coaction among the acetamide or similar amide group, the higher molecular weight acyl or alkyl group or the like, and the free hydroxyl or similar group or groups, the combined result of which is to impart the highly desirable characteristics which are found in said agents. While, as described hereinabove, the agents contain at least one free or unesterified hydroxy group as, for example, in the case of the acetic acid amide of the mono-lauric acid ester of diethanolamine, it may be pointed out that, in some instances, the hydroxy group may be replaced by such groups as amino, carboxyl, and the like, or the hydrogen of the hydroxyl group or groups may be replaced by acetyl, lactyl and similar groups. However, the agents function much more satisfactorily with a free or unesterified hydroxyl group or groups and they are, therefore, particularly preferred.

In the preparation of the agents which are used for the purposes of the present invention, the various higher molecular weight fatty acids or the like, the hydroxy amines, and the carboxylic acids containing not more than five carbon atoms may be utilized in numerous combinations and permutations to make large numbers of agents not specifically mentioned but which are obviously within the scope of the invention The emulsions and dispersions in which the agents described herein may be utilized are many in number and of widely varying character. Among such emulsions and dispersions, which may be of neutral, acid or alkaline character, are those containing pyrethrum, derris, rotenone, and other analogous materials and employed for insecticidal, fungicidal, germicidal, mothproofing, and disinfectant purposes; for cosmetic purposes such as cold creams, vanishing creams, shaving creams of the brushless and lathering type, hand lotions, tissue creams, anti-perspiration creams, and the like; for emulsions of essential oils; for medicinal and pharmaceutical emulsions such as those containing fat-soluble vitamins as, for example, vitamins A and D such as are present in fish liver oils, irradiated ergosterol and the like; for cutting, boring, or drilling oil emulsions or emulsions used for wire drawing; for emulsions for scouring and other treatments of textiles or textile fibres and yarns made from cotton, wool, linen and the like as well as the artificially produced fibres and fabrics such as rayon, cellulose acetates, cellulose propionates, cellulose ethers and similar artificial silk fabrics and silk and wool substitutes; for polishes for furniture, automobiles, and also for boots and shoes; for sizing emulsions used in the textile and paper industries; for greasing and lubricating emulsions; for paint or oil-color emulsions and dispersions; for the preparation of emulsions or dispersions of resins of various other kinds and for various other uses such as abrasive polishes; bitumen, asphalt and pitch emulsions; wax emulsions of wax such as candellila wax, paraffin wax, carnauba wax, montan wax and the like used for polishes and similar purposes; chlorinated rubber emulsions; resin and lacquer emulsions used for coating and impregnating purposes and preferably made in the presence of alkaline materials, such resins including nitrocellulose resins, alkyd resins, acrylic ester resins such as methylmethacrylate, ethyl methacrylate and the like, cellulose esters in general, urea-aldehyde resins, glyptal resins, petroleum resins, coumarone resins, vinyl resins, and the like; so-called lecithin emulsions; emulsions with volatile solvents for dry cleaning; latex and natural and synthetic rubber dispersions; leather-treating emulsions; emulsions having solvent properties for use in cleaning paint surfaces, metal surfaces, woodwork, and floor coverings such as linoleum, rugs and the like, such emulsions frequently containing pine oil with or without oleic acid; for emulsions in the pharmaceutical industry, particularly for external use; for emulsion paints containing linseed oil, shellac, pigments and the like, and for numerous other emulsions.

As indicated hereinabove, the emulsions or dispersions may be prepared from water or aqueous media and water-repelling or hydrophobic substances such as oils and fats of animal, vegetable and mineral origin; waxes such as paraffin, carnauba, beeswax, montan wax and the like; higher fatty acids and other higher molecular weight acids such as stearic acid and palmitic acid; lanolin or wool grease, and numerous other materials of the character indicated. The term "oleaginous material," as employed in the claims, will be understood to encompass oils, fats, higher fatty acids and waxes.

Those emulsions or dispersions which are made in the presence of or which contain an alkaline material such as soap, borax or the like are especially satisfactory, representative examples being cosmetic cream formulae as hereinafter set forth. Where, however, soap or the like is objectionable, the agents hereinabove described may be used as the sole emulsifying or dispersing agents in the emulsions or dispersions.

The emulsions or dispersions may contain desired proportions of addition agents such as talc, medicinal or antiseptic materials, pigments such as lamp-black and zinc oxide; alkali metal phosphates such as pyrophosphates and tetraphosphates, sodium sulphate, alum, perborates such as sodium perborate; hydrophilic gums such as pectin, gum tragacanth, karaya, locust bean, gelatin, arabic, and glue; and solvents such as carbon tetrachloride, monoethyl ether of ethylene glycol, monobutyl ether of ethylene glycol, monoethyl and monobutyl ethers of diethylene glycol, cyclohexanol, and the like.

While, as pointed out, the agents described hereinabove may be used as the sole emulsifying or dispersing agents in emulsions or dispersions, it is frequently desirable to utilize said agents, for example, the mono-stearic acid ester of the acetic acid amide of diethanolamine, in emulsions or dispersions together with known wetting, emulsifying and penetrating agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium sulpho-glutarate, lauryl monoethanolamine sulphoacetate, and the like; sulphuric and sulphonic derivatives of condensation products of alkylolamines and higher fatty acids; reaction products of phosphoric, pyrophosphoric, metaphosphoric, tetraphosphoric, and polyphosphoric acids with higher molecular weight alcohols; Turkey-red oils; compounds of the type of isopropyl naphthalene sodium sulphonate, and other classes of wetting agents.

The following examples are illustrative of the preparation of emulsions or dispersions utilizing the agents which have been described hereinabove. It will be appreciated that various other emulsions or dispersions may be made, as previously pointed out in detail, and that the proportions of the various ingredients including the desired agent may be varied within limits. These and other variations and modifications will be evident to those skilled in the art in the light of the guiding principles which are disclosed herein. All parts listed are by weight except where otherwise indicated.

Example I

*Vanishing cream*

| | Parts |
|---|---|
| Stearic acid | 400 |
| Potassium hydroxide | 27 |
| Water | 1600 |
| Acetic acid amide of the monostearic acid ester of diethanolamine | 20 |
| Perfume | To suit |

Example II

*Shaving Cream*

| | Parts |
|---|---|
| Stearic acid | 18 |
| Mineral oil | 3 |
| Lanolin | 2 |
| Borax | 0.5 |
| Triethanolamine | 0.5 |
| Glycerine | 4 |
| Water | 72 |
| Acetic acid amide of monopalmitic acid ester of diethanolamine | 0.5 |

Example III

*Hand Lotion*

| | Parts |
|---|---|
| Stearic acid | 145 |
| Triethanolamine | 73 |
| Water | 3750 |
| Alcohol | 250 |
| Mineral oil | 250 |
| Quince seed mucilage | 172 |
| Monoethyl ether of diethanolamine | 250 |
| Lactic acid amide of the monostearic acid ester of dipropanolamine | 75 |

Example IV

*Mineral oil emulsion*

| | Parts |
|---|---|
| Mineral oil | 87 |
| Triethanolamine oleate | 12 |
| Acetic acid amide of the monolauric acid ester of diethanolamine | 3 |
| Water | As desired |

Example V

*Cutting oil*

| | Parts |
|---|---|
| Mineral oil | 90 |
| Triethanolamine oleate | 12 |
| Acetic acid amide of monostearic acid ester of 2-amino-2-methyl-1,3-propanediol | 2 |
| Water | 450 |

The proportions of the agents employed are subject to relatively wide variation, the amount utilized being dependent upon the potency of the particular agent selected, the specific character of the emulsion in which it is utilized, and the particular results desired. In general, from about 0.1% to 5.0%, based upon the weight of the oleaginous or water-repelling constituent or constituents, will be effective for most purposes but the amount may be increased substantially. Since, however, good results are, in general, obtained when using the smaller percentages, it is preferred to do so, particularly in view of economic and other considerations. From 0.5% to 1.5%, based on the weight of the oleaginous or water-repelling constituent or constituents, will serve effectively in most cases.

What we claim as new and desire to protect by Letters Patent of the United States is:

1. A composition in the form of an emulsion or dispersion, comprising water, a water-repelling material, and a proportion of an amide of a secondary aliphatic hydroxyamine corresponding to the general formula

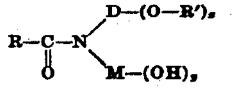

wherein

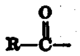

is an aliphatic acyl radical containing not more than five carbon atoms, D and M are organic radicals containing at least two carbon atoms, R′ is an organic lipophile radical containing at least eight carbon atoms, and $x$ and $y$ are small whole numbers.

2. A composition in the form of an emulsion or dispersion, comprising water, oleaginous material, and a proportion of an amide of a secondary aliphatic hydroxy-amine corresponding to the general formula

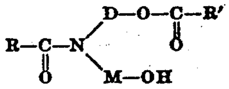

wherein

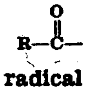

is an aliphatic acyl radical containing not more than five carbon atoms, D and M are organic radicals containing at least two carbon atoms, and

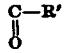

is an aliphatic carboxylic acyl radical containing at least eight carbon atoms.

3. A composition which is adapted to disperse or emulsify on being admixed with aqueous materials, comprising a water-repelling base ingredient and a proportion of an amide of a secondary aliphatic hydroxy-amine corresponding to the general formula

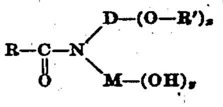

wherein

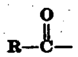

is an aliphatic acyl radical containing not mroe than five carbon atoms, D and M are organic radicals containing at least two carbon atoms, R′ is an organic lipophile radical containing at least eight carbon atoms, and $x$ and $y$ are small whole numbers.

4. A composition which is adapted to disperse or emulsify on being admixed with aqueous materials, comprising oleaginous material as a base ingredient, and a proportion of an amide of a secondary aliphatic hydroxyamine corresponding to the general formula

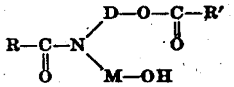

wherein

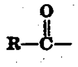

is an aliphatic acyl radical containing not more than five carbon atoms, D and M are organic radicals containing at least two carbon atoms, and

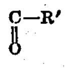

is an aliphatic carboxylic acyl radical containing at least eight carbon atoms.

5. A composition in the form of an emulsion or dispersion, comprising water, oleaginous material, and a proportion of a chemical compound corresponding to the general formula

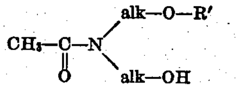

wherein alk is a member selected from the group consisting of alkylene, (alkylene-O-alkylene)$_t$ and (alkylene-S-alkylene)$_w$ where $t$ and $w$ are small whole numbers, and R' is a lipophilic aliphatic radical containing at least eight carbon atoms.

6. A composition which is adapted to disperse or emulsify on being admixed with aqueous materials, comprising oleaginous material as a base ingredient, and a proportion of a chemical compound corresponding to the general formula

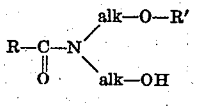

wherein

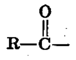

is an aliphatic acyl radical containing not more than five carbon atoms, alk is a member selected from the group consisting of alkylene, (alkylene-O-alkylene)$_t$ and (alkylene-S-alkylene)$_w$ where $t$ and $w$ are small whole numbers, and R' is an alkyl radical containing at least eight carbon atoms.

7. A composition in the form of an emulsion or dispersion, comprising water, oleaginous material, and a proportion of a chemical compound corresponding to the general formula

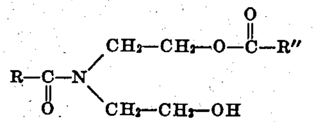

wherein

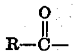

is a fatty acid acyl radical containing not more than five carbon atoms, and

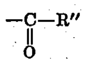

is a fatty acid acyl radical containing at least eight carbon atoms.

8. A composition which is adapted to disperse or emulsify on being admixed with aqueous materials, comprising oleaginous material as a base ingredient, and a proportion of a chemical compound corresponding to the general formula

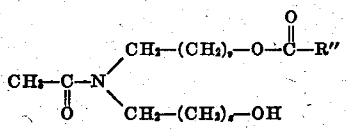

wherein

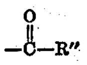

is a fatty acid acyl radical containing at least eight carbon atoms, and $v$ and $z$ are small whole numbers.

9. A composition in the form of an emulsion or dispersion, comprising water, oleaginous material, and a proportion of a chemical compound corresponding to the general formula

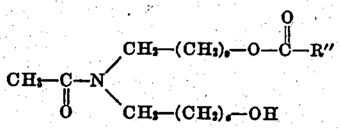

wherein

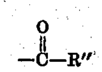

is a fatty acid acyl radical containing at least eight carbon atoms, and $v$ and $z$ are small whole numbers.

10. A composition in the form of an emulsion or dispersion, comprising water, oleaginous material, and a proportion of an amide of a secondary polyamine with an aliphatic acid containing not more than five carbon atoms, said secondary polyamine containing at least two hydroxy-alkyl radicals, the hydrogen of the hydroxyl group of only one of said hydroxy-alkyl radicals being replaced by a lipophile radical containing at least eight carbon atoms.

11. A composition in the form of an emulsion or dispersion, comprising water, oleaginous material, and a proportion of an amide of a secondary aliphatic di-hydroxy amine with a carboxylic acid containing not more than five carbon atoms, the hydrogen of only one hydroxy group of said hydroxy amine being replaced by an aliphatic radical containing at least eight carbon atoms.

12. A composition in the form of an emulsion or dispersion, comprising water, oleaginous material, and a proportion of the acetic acid amide of the mono-stearic acid ester of diethanolamine.

13. A cosmetic preparation, in the form of an emulsion of oleaginous and aqueous media, containing a proportion of an amide of a secondary aliphatic hydroxy-amine corresponding to the general formula

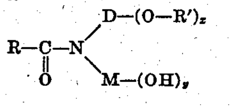

wherein

is an aliphatic acyl radical containing not more than five carbon atoms, D and M are organic radicals containing at least two carbon atoms, R' is an organic lipophile radical containing at least eight carbon atoms, and $x$ and $y$ are small whole numbers.

14. A cosmetic preparation comprising an emulsion of oleaginous and aqueous materials, the oleaginous material comprising predominantly a normally solid higher molecular weight fatty acid, and containing a proportion of a chemical compound corresponding to the general formula

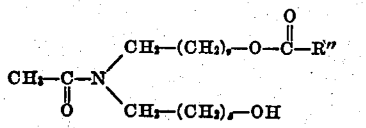

wherein

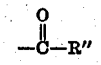

is a fatty acid acyl radical containing at least eight carbon atoms, and y and z are small whole numbers.

15. A composition in the form of an emulsion or dispersion, comprising water, a water-repelling material, and a proportion of an amide of a secondary aliphatic hydroxy-amine with a carboxylic acid containing not more than five carbon atoms, the hydrogen of a hydroxy group of said hydroxy-amine being replaced by an aliphatic radical containing at least eight carbon atoms, said amide containing at least one free hydroxy group.

16. A composition which is adapted to disperse or emulsify on being admixed with aqueous materials, comprising oleaginous material as a base ingredient, and a proportion of a chemical compound in the form of an amide of an aliphatic hydroxy-amine with an aliphatic carboxylic acid containing not more than five carbon atoms, said chemical compound also including at least one free hydroxy group and a higher molecular weight carboxylic acyl radical having at least eight carbon atoms ester-linked to an hydroxy group of the hydroxy-amine.

17. A composition in the form of an emulsion or dispersion including aqueous material and a proportion of a compound in the form of an amide of an hydroxy-alkyl amine with a carboxylic acid containing not more than five carbon atoms, said compound also containing at least one free hydroxy group and at least one lipophile group having at least eight carbon atoms.

18. A composition which is adapted to disperse or emulsify on being mixed with aqueous materials, comprising oleaginous material, and a proportion of a compound comprising an amide of a secondary hydroxy-alkyl amine with an aliphatic carboxylic acid containing not more than five carbon atoms, said compound also containing at least one free hydroxyl group and at least one carboxylic acyl radical having at least eight carbon atoms ester-linked to an hydroxy group or groups of said hydroxy-alkyl amine.

BENJAMIN R. HARRIS.
FRANK J. CAHN.